United States Patent [19]

Lamberton

[11] 3,708,146
[45] Jan. 2, 1973

[54] MEANS FOR ENCASING RIGID MEMBERS WITH CONCRETE

[76] Inventor: Bruce A. Lamberton, c/o Construction Techniques, Inc., 1111 Superior Building, Cleveland, Ohio 44114

[22] Filed: Dec. 7, 1970

[21] Appl. No.: 95,761

[52] U.S. Cl. ..................249/1, 61/53.52, 249/90, 425/125
[51] Int. Cl. ....................E02d 5/38, B22d 19/08
[58] Field of Search...264/86; 25/118 P, 1 A, DIG. 9; 61/53.54, 54, 56.5, 53.52, 35; 249/1, 90, 51; 425/125

[56] References Cited

UNITED STATES PATENTS

| | | |
|---|---|---|
| 3,397,260 | 8/1968 | Lamberton..............................264/86 |
| 3,492,823 | 2/1970 | Lamberton......................61/53.52 X |
| 3,338,058 | 8/1967 | Young..............................25/118 P X |

Primary Examiner—J. Spencer Overholser
Assistant Examiner—B. D. Tobor
Attorney—Meyer, Tilberry & Body

[57] ABSTRACT

A flexible sleeve of a larger circumference than the member to be encased is fastened at its lower end tightly around the member. The upper end of the sleeve has a rigid hoop of a circumference larger than the member and means are provided for placing the sleeve under longitudinal tension. A cementitious grout of a high water cement ratio is then poured into the open upper end of the sleeve. If the sleeve is porous, the water of the grout will bleed through the pores and the water-cement ratio will be lowered. The now thickened grout is then allowed to harden. The sleeve may then be removed by opening a longitudinal extending seam which is usually a zipper and reused.

6 Claims, 3 Drawing Figures

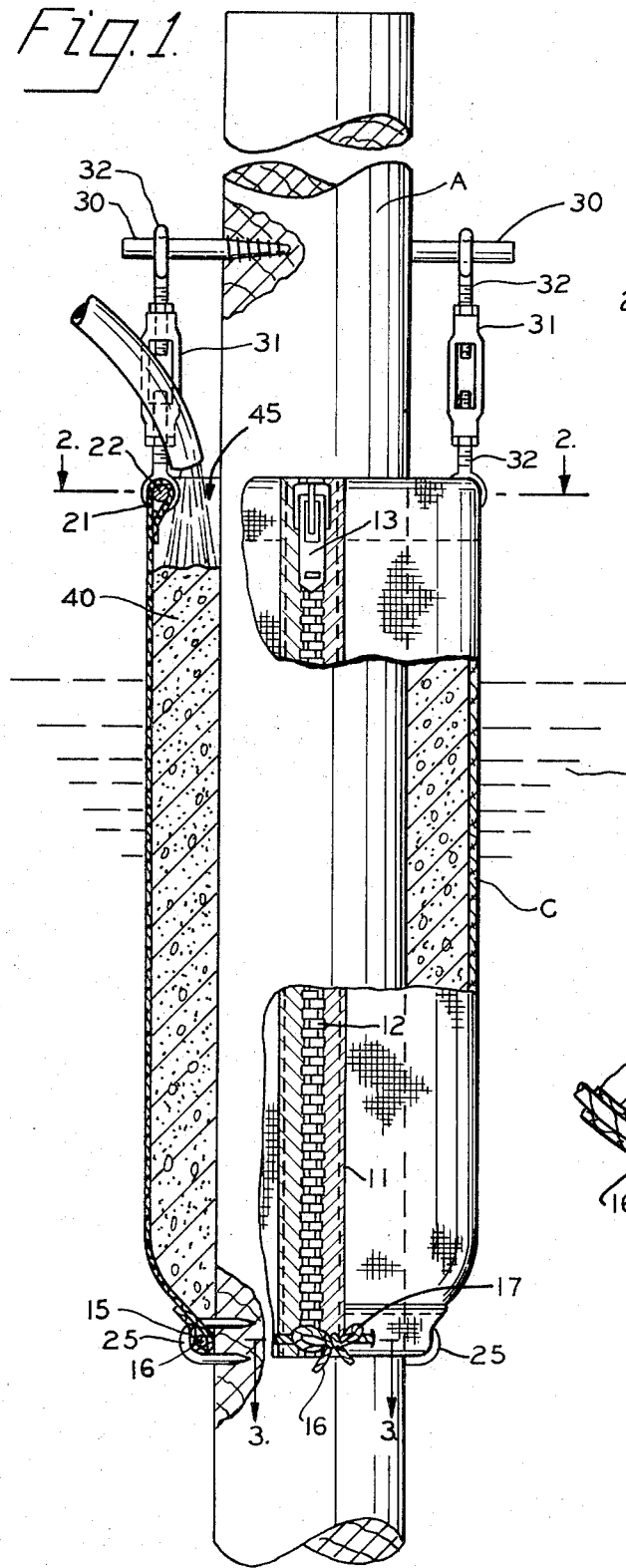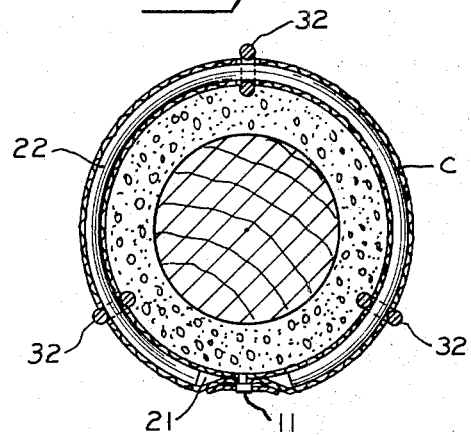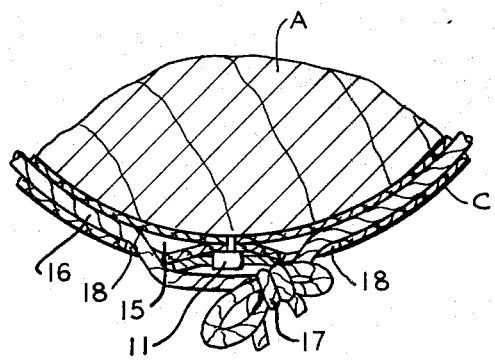

MEANS FOR ENCASING RIGID MEMBERS WITH CONCRETE

This invention pertains to the art of concrete construction work and more particularly to means and method for encasing vertically extending rigid members with a hardened cementitious material, e.g. concrete.

The invention is particularly applicable to encasing the piers of bridges and other devices supported by vertical columns with concrete and will be described with particular reference thereto although it will be appreciated that the invention has other and broader applications.

Cement as used herein is a material which when mixed with a liquid and allowed to stand will harden. The cement usually employed is portland cement and the liquid is water. Cementitious grout is a mixture of a liquid, cement and other divided solids, such as pozzolana, sand, aggregate and/or rocks. The ratio of liquid to the finer solids determines the flowability of the grout. The ratio of liquid to the cement usually determines the strength of the hardened product. Concrete is the hardened product of allowing the cement, solids and liquid to harden.

Bridges often have their supporting columns extending downwardly from a point above the surface of a body of water to the solid foundation below. Water action on the column, particularly at the water surface, often erodes away the material of the column whether it is wood or concrete and it is necessary to encase the column at the point of erosion with concrete to prevent further erosion.

In the past, this has been frequently done by building a rigid form around the column from a point below where the erosion has started to a point well above the surface of the water. This rigid form was then filled with a rough aggregate and a cementitious grout (containing solids not larger than sand) was then pumped into the form starting from the lower end. The grout rose through the aggregate, displaced the water and filled the interstices between the aggregate. The grout was then allowed to harden to concrete and the form was removed.

Such forms are heavy, bulky and expensive. They are also difficult to install requiring the services of several divers, work boats along side with supporting cranes and the like.

My U.S. Pat. No. 3,397,260 describes an improved method of repairing such columns by providing an elongated sheet of a heavy, porous fabric material, wrapping the sheet around the column from a point below where the erosion has begun to a point above fastening by stitching the vertical edges of the material together, tying the upper and lower ends of the material to and against the column by means of ropes or other securing means, inserting a hose into the inside of the closed cavity created by the material tied at both ends and pumping a cementitious grout having a high water-cement ratio into the cavity thus formed. When the cavity is filled, the pumping is continued with the result that water is expressed through the pores of the material with the solids of the grout remaining behind such that the water-cement ratio is substantially lowered and allowing the thickened grout to harden to concrete. A hardened cement results of a much higher density and strength than would have been the case if the grout had been allowed to harden at the high water-cement ratio.

The present invention contemplates improvements on the methods and means described in that patent.

In accordance with the present invention, a form is made out of a large flexible sheet of, preferably porous, fabric material. The width of the material is greater than the circumference of the post or column to be encased. The length of the sheet is greater than the vertical height of the area to be encased in cement. The vertical edges of the sheet are preferably provided with a zipper. This sheet is wrapped around the column and the zipper engaged. The lower end of the sheet now in the shape of a sleeve is then fastened in tight engagement with the column below the lower end of the length of the column to be encased by any suitable means such as a draw string or the like. The upper end of the sleeve is held in spaced relationship to the sides of the column and means are provided for supporting the upper end of the sleeve and preferably placing the sleeve under a longitudinal tension. A highly liquid cementitious grout is then poured into the open upper end of the sleeve until it is filled. If a sleeve is of porous material, water will be expressed there through leaving behind the solid particles of cement, sand, aggregate and other materials used in the grout. The water-cement ratio will thus be reduced. Whether a porous sleeve or a non-porous sleeve is employed, the cementitious material is then allowed to harden to concrete.

The principle objective of the invention is the provision of a new and improved means and method for encasing a vertical column with concrete which is simple to employ, inexpensive and effective.

Another objective of the invention is the provision of a new and improved method of encasing a vertical column in concrete by means of a fabric sleeve surrounding the column and fastened at the lower edge only to the column below the area to be repaired and wherein a grout is poured into the open upper end of the sleeve.

Another objective of the invention is the provision of a new and improved form usable for encasing columns with concrete comprised of a sheet of fabric material having a zipper along each vertical edge, a draw string along its lower edge, and means at its upper edge for placing the sleeve formed by putting the zippers together under longitudinal tension.

The invention may take physical form in certain steps and combinations of steps and certain parts and arrangements of parts a preferred embodiment of which will be described in this specification and illustrated in the accompanying drawing which is a part hereof and wherein:

FIG. 1 is a side view partly in cross section a column with the form of the present invention in place there around illustrating a preferred embodiment of the invention.

FIG. 2 is a cross sectioned view of FIG. 1 taken approximately in the line 2—2 thereof.

FIG. 3 is a detailed cross sectional view taken on the line 3—3 of FIG. 1 showing the method of securing the lower end of the sleeve to the column.

Referring now to the drawings wherein the showings are for the purposes of illustrating a preferred embodiment of the invention only and not for the purposes of limiting same, FIG. 1 shows a vertically extending column A of concrete or other material extending from above the surface of a body of water B downwardly under the water to a lower supporting foundation (not shown). A form C in the shape of an elongated sleeve is fastened at its lower end to the column A and extends upwardly therefrom to a point above the surface 10 of the water B and tensioning means D are provided for supporting the upper end of sleeve C preferably under longitudinal tension. The form C is shown being filled with a cementitious grout E from a hose F.

The column A may be of any known construction either of cement, steel, wood or a combination of several. Its cross sectional shape may be as desired either circular, rectangular or polygonal but preferably the column A should not have any concave surfaces at the point where the form C is to be fastened thereto. If there are concave surfaces at this point, they must be filled. In the embodiment shown the column is generally circular and is of wood.

The form C before being placed in position is in the form of an elongated sheet of material having a width greater than the circumference of the column A by an amount such that when it is formed into the sleeve C, its diameter will exceed the diameter of the column A by an amount equal to twice the thickness of the desired concrete reinforcing layer. Thus the circumference of the column is defined by the formula $\pi d$ where $d$ is the diameter of the column. The width of the sheet should be equal to $\pi(d+2t)$ where $t$ equals the desired thickness of the cement layer to be placed around the column A. Both vertical edges 11 of the material are provided with a zipper 12 of conventional construction having a slide 13 which when moved vertically will cause the elements of the zipper 12 to interlock as is known. The zippers 12 extend from the lower edge upwardly to a point usually just short of the upper edge.

The lower edge of the sheet of material is doubled back on itself and stitched to provide a tube 15 through which a rope 16 is threaded with the ends 17 of the rope 16 coming out of the tube adjacent the vertical edges 11 through a hole 18 located at a point prior to the point of attachment of the zipper 12 to the vertical edge 11.

The upper edge of the sheet is also doubled back on itself and stitched so as to provide a tube 21 through which a circular hoop 22 of relatively rigid material can be inserted after the sheet of material is in place around the column A. (Usually this hoop is inserted before the edges 11 are zippered together.)

The form C is installed by wrapping it around the column and closing the zippers 12 by means of the slide 13. Thereafter, the lower edge of the form is tightly secured to the outer surfaces of the column by means of tying the draw rope 16 into a knot 17 in such a manner that the rope 16 extends over the zipper 12 and fastens and holds the zipper 12 and the inner side of the tube 15 against the outer surface of the column. While it is desirable to pull and tie the rope as tight as possible, it is not absolutely necessary that this result in a water tight seal between the sleeve and column. Obviously, a rope or wire encircling the outside of the sleeve at the lower end could be used.

The metallic hoop 22 has a diameter such that its circumference will approximately equal the width of the sheet. It is inserted into the upper tube 21 by feeding it into the open ends of the tube 21.

The rope 16 is preferably fastened to the column A so as to resist vertical tensions by means of a plurality of staples 25 hammered into the column A in such a manner as to fit over the tie rope 12. Again it is to be emphasized that small leaks are unimportant and any other form of fastening could be employed.

In accordance with the invention, means are provided for supporting the upper end of the form C. When the form C is filled with grout, such means and the form will be under longitudinal tension. In some instances and preferably these means are employed to place the form initially under longitudinal tension. Such means may take a number of different forms but in the embodiment shown are comprised of pins or stakes 30 hammered into the side of the column A at a point above the upper edge of the form C and turnbuckles 31 and wires 32 extend between the stakes 30 and the hoop 22 which can then be tightened thus positioning the upper end of the form C and in some instances placing the form under longitudinal tension even before the grout is poured. Hydraulic means can be employed or ropes extending upwardly to the overhead structure can also be employed. It is preferred that at least three of such means are provided so as to stabilize and locate the upper edge of the form C and accurately and uniformly space it from the surface of the column A.

The material of the form is preferably of a heavy, porous, woven nylon or other high strength fiber material having openings there through not exceeding approximately one thirty-second of an inch. The preferred material of the form has been described in my earlier referred to patent and will not be further detailed here.

Once the form is in place, a cementitious grout 40 as described in said patent is then poured into the open upper space 45 between the upper end of the form C and the column A until the form is substantially completely filled. It will be appreciated that the grout is substantially heavier than the surrounding water B and the hydrostatic pressure created on the liquid grout will thus tend to force the grout outwardly through the pores of the material. However, the aggregate and sand are of a size too large to pass through the pores of the fabric. This aggregate and sand and any other fines in the grout such as the portland cement act to block up the pores of the form and then act as a filter bed to prevent any solid particles from passing through the pores of the form but allow the flow of water under pressure through the filter bed and the pores of the form. Thus, the hydrostatic pressure causes the water to be expressed outwardly through the pores of the form and the water-cement ratio gradually increases until the material in the form is substantially solid and non-flowable. The now unflowable grout is then allowed to harden resulting in a dense concrete having a much greater strength and density than would be the case if the water had not been expressed through the pores of the form. This hydrostatic pressure also presses the grout against the column and a tight bond results.

The form C may now be removed by opening the zipper 12 and untying the rope knot 17. It will be appreciated, however, that if the greater strength of the lower water cement ratio is not desired, then a non-porous form can be employed. In such cases, a grout having a lower water-cement ratio will be used initially.

It is preferred that the water-cement ratio at the time that the grout is poured into the form be in excess of 0.50. As the grout is continued to be poured, the water-cement ratio particularly adjacent the surface or the form is gradually reduced to somewhere between 0.25 and 0.30 which ratios are substantially the optimum for obtaining a maximum strength and maximum density concrete. Such characteristics are desirable particularly at the surface. The water-cement ratio remote from the surface will be somewhat higher and the ultimate strength and density of the hardened concrete will be somewhat lower but with the high density high strength outer shell this is not objectionable.

The invention has been described with reference to a preferred embodiment. Obviously, modifications and alterations will occur to others upon reading and understanding of this specification and it is my intention to include all such modifications and alterations insofar as they come within the scope of the present invention.

Having thus described my invention I claim:

1. A form for encasing vertical columns with concrete comprising a sheet of material having cooperating zippers along the vertical edges, a tube at the lower edge and a tie rope in said tube, a rigid hoop member and a tube at the upper edge adapted to receive said hoop member whereby said form is held in spaced relationship to said column.

2. The form of claim 1 wherein said tie rope exits from said tube so as to extend over the outside of said zipper.

3. Apparatus for encasing a vertical column with concrete comprising an elongated sleeve of fabric material, means at the lower end for fastening said sleeve around and against a column to be encased, means at the upper end for holding the upper end of said sleeve in spaced relationship to the column, and means extending upwardly from said spacing means for supporting the upper end of said sleeve.

4. Apparatus of claim 3 wherein said sleeve has a vertically extending zipper joining separable edges.

5. Apparatus of claim 3 wherein said upwardly extending means includes means for placing said sleeve under longitudinal tension.

6. Apparatus of claim 4 wherein said zipper extends to the lower edge of said sleeve said fastening means is in the form of a tension member in a tube formed in the lower end of the sleeve which member exits the tube adjacent to and extends over the zipper.

* * * * *